United States Patent
Ma et al.

(10) Patent No.: US 9,029,020 B2
(45) Date of Patent: May 12, 2015

(54) NEGATIVE ACTIVE MATERIAL, METHOD FOR PREPARING THE SAME AND LITHIUM ION BATTERY COMPRISING THE SAME

(75) Inventors: Yongjun Ma, Guangdong (CN); Pei Tu, Guangdong (CN); Zizhu Guo, Guangdong (CN)

(73) Assignee: Shenzhen BYD Auto R&D Company Limited, Guangdong (CN)

(*) Notice: Subject to any disclaimer, the term of this patent is extended or adjusted under 35 U.S.C. 154(b) by 100 days.

(21) Appl. No.: 13/989,186

(22) PCT Filed: Aug. 25, 2011

(86) PCT No.: PCT/CN2011/078950
§ 371 (c)(1),
(2), (4) Date: May 23, 2013

(87) PCT Pub. No.: WO2012/071914
PCT Pub. Date: Jun. 7, 2012

(65) Prior Publication Data
US 2013/0244087 A1    Sep. 19, 2013

(30) Foreign Application Priority Data
Nov. 30, 2010   (CN) .......................... 2010 1 0565500

(51) Int. Cl.
| | |
|---|---|
| *H01M 4/13* | (2010.01) |
| *H01M 4/58* | (2010.01) |
| *H01M 4/583* | (2010.01) |
| *H01M 4/36* | (2006.01) |

(Continued)

(52) U.S. Cl.
CPC .............. *H01M 4/583* (2013.01); *H01M 4/362* (2013.01); *H01M 4/38* (2013.01); *H01M 4/48* (2013.01); *H01M 4/5825* (2013.01); *H01M 10/0525* (2013.01); *Y02E 60/122* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 2003/0138698 A1* | 7/2003 | Lee et al. .................... | 429/231.8 |
| 2009/0169994 A1* | 7/2009 | Mah et al. .................. | 429/218.1 |
| 2011/0104553 A1* | 5/2011 | Pol et al. ....................... | 429/156 |

FOREIGN PATENT DOCUMENTS

| | | |
|---|---|---|
| CN | 1327275 A | 12/2001 |
| CN | 1705148 A | 12/2005 |

(Continued)

OTHER PUBLICATIONS

Preparation and electrochemical properties of composites of carbon nanotubes loaded with Ag and TiO2 nanoparticle for use as anode material in lithium-ion batteries, Electrochimica Acta, 53, 2008, 6351-6355.*

(Continued)

*Primary Examiner* — Cynthia K Walls
(74) *Attorney, Agent, or Firm* — Brinks Gilson & Lione

(57) ABSTRACT

A negative active material, a method for preparing the negative active material and a lithium ion battery comprising the same are provided. The negative active material may comprise: a core, an intermediate layer consisting of a first material and an outmost layer consisting of a second material, which is coated on a surface of the intermediate layer. The first material may be at least one selected from the group consisting of the elements that form alloys with lithium, and the second material may be at least one selected from the group consisting of transition metal oxides, transition metal nitrides and transition metal sulfides.

20 Claims, 1 Drawing Sheet

(51) Int. Cl.
  *H01M 4/38* (2006.01)
  *H01M 4/48* (2010.01)
  *H01M 10/0525* (2010.01)
  *B82Y 30/00* (2011.01)

(56) References Cited

FOREIGN PATENT DOCUMENTS

| CN | 1891668 A | | 1/2007 | |
| CN | 1705150 | * | 7/2007 | .............. H01M 4/04 |
| CN | 101207194 A | | 6/2008 | |
| CN | 101425580 A | | 5/2009 | |
| CN | 101442123 | | 5/2009 | |
| WO | WO 02/27822 A1 | | 4/2002 | |
| WO | WO 2004/114439 A1 | | 12/2004 | |

OTHER PUBLICATIONS

English abstract of CN 1705150, retrived from EAST on Oct. 7, 2015.*
International Search Report, International Application No. PCT/CN2011/079850, Nov. 24, 2011, 4 pages.

* cited by examiner

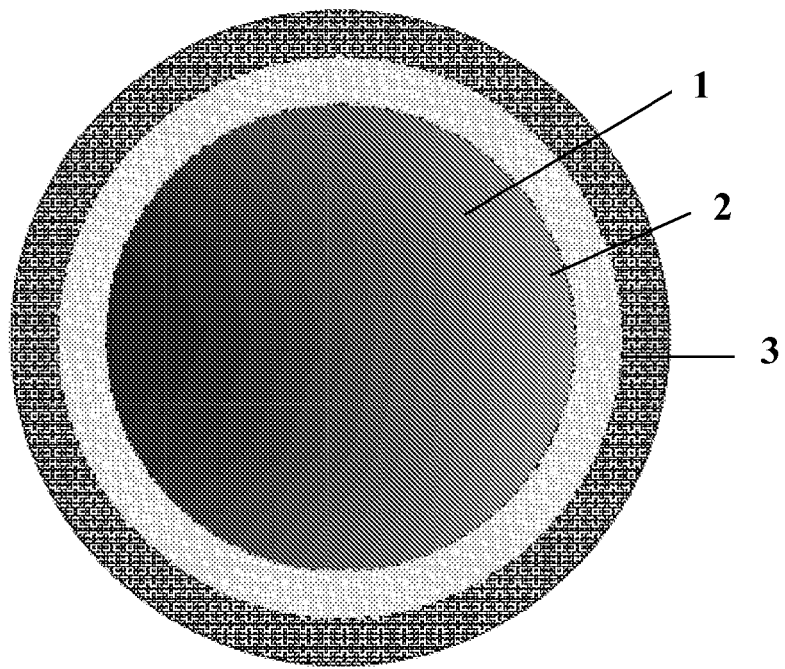

NEGATIVE ACTIVE MATERIAL, METHOD FOR PREPARING THE SAME AND LITHIUM ION BATTERY COMPRISING THE SAME

CROSS-REFERENCE TO RELATED APPLICATION

This application is the national phase application of PCT Application No. PCT/CN2011/078950, filed Aug. 25, 2011, which claims the priority to and benefits of Chinese Patent Application No. 201010565500.1 filed with the State Intellectual Property Office of P.R. China on Nov. 30, 2010, the entire content of both hereby incorporated by reference.

FIELD

The present disclosure relates to lithium ion battery field, more particularly, to a negative active material, a method for preparing the negative active material and a lithium ion battery comprising the same.

BACKGROUND

It is to be understood that the description in this part only provides some background information relating to the present disclosure, which may or may not constitute prior art.

Nowadays, a lithium ion battery is a new green chemical power source. Compared with conventional nickel-cadmium batteries and conventional nickel hydrogen batteries, lithium ion batteries have many advantages such as higher voltage, longer cycling life and higher energy density etc. Ever since the Japanese company Sony launched the first generation lithium ion batteries, lithium ion batteries have been developed rapidly and applied in various kinds of portable devices. The negative electrode in the conventional lithium ion battery comprises graphite carbon material. However, the theoretical specific capacity of the carbon material is only about 372 mAh/g. Therefore, further improvement of the capacity of the lithium ion battery is restricted.

SUMMARY

The present disclosure is directed to solve at least one problem existing in the prior art. A negative active material for a lithium ion battery and a method for preparing the same may need to be provided, which may enhance the cycling performance of the negative active material. Further, a lithium ion battery may also need to be provided.

Some embodiments of the present disclosure provide a negative active material for a lithium ion battery, comprising: a core consisting of a carbon material; an intermediate layer consisting of a first material, in which the intermediate layer is coated on the core; and an outmost layer consisting of a second material, in which the outmost layer is coated on the intermediate layer; in which the first material is at least one selected from the group consisting of the elements that form alloys with lithium, and the second material is at least one selected from the group consisting of transition metal oxides, transition metal nitrides and transition metal sulfides.

Some embodiments of the present disclosure provide a method preparing a negative active material, comprising the steps of: coating a first material on a core consisting of a carbon material; and coating a second material onto the first material to obtain the negative active material. The first material is at least one selected from the group consisting of the elements that form alloys with lithium, and the second material is at least one selected from the group consisting of transition metal oxides, transition metal nitrides and transition metal sulfides.

Some embodiments of the present disclosure provided a lithium ion battery, comprising: a battery shell; and an electric core and an electrolyte housed in the battery shell. The electric core comprises a positive electrode, a negative electrode and a separator disposed between the positive electrode and the negative electrode; and the negative electrode comprises a negative substrate and a negative active material as described hereinabove disposed on the negative substrate.

The negative active material according to an embodiment of the present disclosure has a three-layered composite structure. The core consisting of the carbon material is used as a skeleton of the negative active material, thus effectively avoiding agglomeration of nanometer materials and providing excellent electron conductive channels. The intermediate layer consisting of the first material is coated onto the surface of the core, and the first material may be at least one material that may form an alloy with lithium, thus ensuring high capacity of the negative active material. The second material forming the outmost layer coated on the surface of the intermediate layer may be at least one selected from the group consisting of transition metal oxides, transition metal nitrides and transition metal sulfides; and the transition metal oxides, transition metal nitrides or transition metal sulfides may form a dynamic solid electrolyte layer in the charging and discharging process, thus further improving the cycling performance of the negative active material and effectively avoiding side reactions caused by volume change of the first material during charging and discharging.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which:

The drawing of the present disclosure is a schematic view of a negative active material for a lithium ion battery according to an embodiment of the present disclosure.

DETAILED DESCRIPTION

Reference will be made in detail to embodiments as well as the drawings of the present disclosure. The embodiments described herein with reference to drawings are explanatory, illustrative, and used to generally understand the present disclosure. The embodiments shall not be construed to limit the present disclosure. And it should be understood that any appropriate design modification or any improvement and the like which can be made based on the knowledge of those skilled in the art without departing from the spirit is within the scope of the present disclosure.

As shown in the drawing of the present disclosure, the negative active material according to an embodiment of the present disclosure may comprise: a core 1, an intermediate layer 2 coating the core 1, and an outermost layer 3 coating the intermediate layer 2. The core 1 may consist of a carbon material, the intermediate layer 2 may consist of a first material, and the outermost layer 3 may consist of a second material. The first material may be at least one selected from the elements which can form alloys with lithium, and the second material may be at least one selected from the group consisting of transition metal oxides, transition metal nitrides and transition metal sulfides.

The inventors of the present disclosure have found, after long-time experimentation, that the negative active material consisting of transition metal oxides, transition metal nitrides or transition metal sulfides have a lithium storage mechanism different from those of an insert type negative active material (e.g., the carbon material) and an alloy type negative active material (e.g., the first material). Such materials form lithium oxides, nitrides or sulfides in the lithium insertion or intercalation process, which may improve the stability of the electrolyte film. The negative active material according to an embodiment of the present disclosure has a three-layered composite structure. The core consisting of the carbon material may be used as a skeleton of the negative active material, thus effectively avoiding agglomeration of nanometer materials and providing excellent electron conductive channels. The intermediate layer consisting of the first material is coated onto the surface of the core, and the first material may be at least one material that can form an alloy with lithium, thus ensuring high capacity of the negative active material. The second material forming the outmost layer coated on the surface of the intermediate layer may be at least one selected from the group consisting of transition metal oxides, transition metal nitrides and transition metal sulfides; and the transition metal oxides, transition metal nitrides or transition metal sulfides may form a dynamic solid electrolyte layer during charging and discharging, thus further improving the cycling performance of the negative active material and effectively avoiding side reactions caused by volume change of the first material in the charging and discharging process.

In the negative active material of the present disclosure, the carbon material may be any conventional carbon material that may reversibly intercalate and de-intercalate lithium ions, for example, natural graphite, artificial graphite, coke, carbon black, pyrolytic carbon, or carbon fiber. In one embodiment, the carbon material may be at least one selected from the group consisting of graphite, hard carbon, soft carbon, graphitized mesocarbon microbeads (MCMB), carbon fiber, and carbon nanotube. To achieve enhanced lithium ion insertion and extraction (or intercalation and de-intercalation) performance of the carbon material, in one embodiment, each of graphite, hard carbon, soft carbon, and MCMB may independently have an average particle diameter of about 2 µm to 20 µm; and each of carbon fiber and carbon nanotube may independently have an average particle diameter of about 10 nm to 500 nm and a length of about 2 µm to 50 µm. The carbon material as the skeleton of the negative active material may effectively avoid the agglomeration of the first material and the second material and may provide excellent electron conductive channels. In one embodiment, the core 1 may have a spherical shape shown in the drawing of the present disclosure. It wound be appreciated that the core 1 may not only have a spherical shape but also may have other shapes, for example, a near-spherical shape, such as an ellipsoidal shape, a sheet-like shape, a linear shape, or a three-dimensional rectangular shape.

The first material may be at least one selected from the elements that may form an alloy with lithium. For example, the first material may be at least one selected from the group consisting of Si, Ge, Sn, Sb, Al, Pb, Ga, In, Cd, Ag, Hg and Zn, and the median particle size of the first material is about 50 nm±10 nm. As these elements may form an alloy with lithium, the capacity of the negative electrode in the lithium ion battery may be enhanced. In one embodiment, in order to further enhance the capacity of the negative electrode, the first material may be at least one selected from the group consisting of Si, Ge, Sn and Sb. Each of the intermediate layer 2 and the outmost layer 3 may have a hollow spherical shape as shown in the drawing of the present disclosure. When the core 1 is spherical, each of the intermediate layer 2 and the outmost layer 3 may not only have a hollow spherical shape, but also have a three-dimensional reticular shape or other suitable shapes. When the core 1 has a sheet-like shape, each of the intermediate layer 2 and the outmost layer 3 may also have a sheet-like shape accordingly. It is to be understood that the intermediate layer 2 has a shape corresponding to that of the core 1. There is no special limit on the shapes of the intermediate layer 2 and the outmost layer 3, provided that the intermediate layer 2 may be continuously coated onto the surface of the core 1 and the outmost layer 3 may be continuously coated onto the surface of the intermediate layer 2.

The second material may be at least one selected from the group consisting of: transition metal oxides, transition metal nitrides and transition metal sulfides. For example, the second material may be at least one selected from the compounds formed by at least one element of O, N and S with at least one element of Sc, Ti, V, Cr, Mn, Fe, Co, Ni, Zn, Y, Zr, Nb, Mo, Tc, Ru, Rh, Pd, Ag, Cd, La, Hf, Ta, Re, W, Os, Ir, Pt, Au and Hg. In one embodiment, the second material may be transition metal oxides. Because the transition metal has various oxidation states, change between valence states may provide a higher specific capacity, and thus reversibility of lithium insertion and extraction (or intercalation and de-intercalation) may be improved. In one embodiment, the average particle diameter of the second material is less than 1 µm, so that it is beneficial to the formation of a compact second material layer.

In the negative active material of the present disclosure, in some embodiments, based on the total weight of the negative active material, the amount of the first material may be about 2 wt % to 50 wt %, the amount of the second material may be about 0.1 wt % to about 20 wt %, and the remainder may be the carbon material. In one embodiment, the amount of the first material may be about 5 wt % to 20 wt %, the amount of the second material may be about 1 wt % to 5 wt %, and the remainder may be the carbon material. By using the preferred composition of the negative active material, the specific capacity and the cycling performance of the negative electrode may be improved accordingly.

The negative active material according to an embodiment of the present disclosure has a three-layered composite structure. The existence of the first material (Si, Ge, Sn, Sb, etc.) may achieve higher capacity of the negative active material. The existence of the second material may enhance the cycling performance of the negative active material. The reasons lie in that the second material may form a dynamic solid electrolyte layer during charging and discharging, thus effectively avoiding side reactions caused by the volume change of materials like Si, Ge, Sn or Sb during charging and discharging.

Specifically, during charging, the second material in the outmost layer in the negative active material is firstly reacted with lithium ions to form lithium oxides, nitrides or sulfides in the early stage of the charging process. These materials may form a solid electrolyte layer, which is an ion conductor and allows lithium ions to pass therethrough. Meanwhile, these materials may decrease the conductivity of electrons on the surface of the negative electrode, thus effectively preventing the decomposition of solvent molecules after obtaining electrons from the surface of the negative electrode. With the progress of the charging process, the lithium ions may react with the first material in the intermediate layer and the carbon material in the core. Although the volume of the first material and the carbon material may be largely increased in the reaction, the formation of the ion conductor in the early stage of the charging process may prevent large scale breaking and/or peeling off of the materials like Si, Ge, Sn, or Sb in the volume expansion process, and may restrain the unwanted results caused by the volume expansion. Further, during discharging, the lithium ions may be firstly de-intercalated from the core and the intermediate layer, and with the extraction of the lithium ions, lithium oxides, lithium nitrides or lithium sulfides may form transition metal oxides, transition metal nitrides or transition metal sulfides respectively and the negative active material may be recovered to its initial state. In this way, the side reaction of the electrolyte with the expanded and pulverized alloy material such as Si, Ge, Sn, or Sb may be effectively avoided, thus avoiding problems such as electron conduction blocking between the materials caused by by-products.

It can be understood that the present disclosure is not restricted to the embodiments of the present disclosure. Other negative active materials of different structures may also be applied in the present disclosure as long as the purpose and effect of the present disclosure can be realized.

Embodiments of the present disclosure further provide a method for preparing the negative active material as described above. In one embodiment, a first material is coated on a core consisting of a carbon material to form a composite material, and a second material is coated onto the first material to prepare the negative active material. Various methods known in the art may be used to prepare the negative active material. The first material is at least one selected from the group consisting of the elements that form alloys with lithium, and the second material is at least one selected from the group consisting of transition metal oxides, transition metal nitrides and transition metal sulfides. In one embodiment, the method for preparing the negative active material comprises the following steps.

Step 1: The carbon material and the first material are added to an organic solvent, then a non-water-soluble polymer is added to the solvent to form a mixture, the mixture is agitated intensely to form a uniform and stable solid-liquid mixture. And then the solid-liquid mixture is dried at 50-100° C. under vacuum to form the composite material of carbon material coated with the first material.

The carbon material may be any carbon material that is able to reversibly intercalate and de-intercalate lithium ions, for example, natural graphite, artificial graphite, coke, carbon black, pyrolytic carbon, or carbon fiber. In one embodiment, the carbon material may be at least one selected from the group consisting of graphite, hard carbon, soft carbon, graphitized mesocarbon microbeads (MCMB), carbon fiber, and carbon nanotube. To achieve improved lithium ion insertion and extraction performances of the carbon material, in one embodiment, each of graphite, hard carbon, soft carbon, and MCMB may independently have an average particle diameter of about 2 μm to 20 μm, and each of carbon fiber and carbon nanotube may independently have an average particle diameter of about 10 nm to 500 nm and a length of about 2 μm to 50 μm. The carbon material as the skeleton of the negative active material may effectively avoid the agglomeration of the first material and the second material and may provide excellent electron conductive channels. In one embodiment, the core 1 may have a spherical shape shown in the drawing of the present disclosure. It wound be appreciated that the core 1 may not only have a spherical shape but also may have other shapes, for example, a near-spherical shape (e.g., an ellipsoidal shape), a sheet-like shape, a linear shape, or a three-dimensional reticular shape.

The first material may be at least one selected from the elements that can form an alloy with lithium. To improve the capacity of the negative electrode in the lithium ion battery, the first material may be at least one selected from Si, Ge, Sn and Sb.

The organic solvent may be at least one selected from the group consisting of ethanol, acetone, tetrahydrofuran, and N-methyl pyrrolidone.

The non-water-soluble polymer may be at least one selected from the group consisting of polythiophene, polypyrrole, polytetrafluoroethylene, polyvinylidene fluoride, polyethylene, polypropylene, ethylene-propylene-diene copolymer resin, styrene-butadiene rubber, polybutadiene, fluororubber, polyethylene oxide, polyester resin, phenolic resin, epoxide resin, carboxypropyl cellulose, ethyl cellulose and asphaltum. The non-water-soluble polymer is used to attach the first material stably onto the surface of the carbon material so that the first material will not peel off while coating the second material, even when the coating process of the second material is carried out in a water solution.

Based on 100 weight parts of the carbon material, the amount of the first material is about 2 weight parts to about 167 weight parts, the amount of the organic solvent is about 100 weight parts to about 400 weight parts, and the amount of the non-water-soluble polymer is about 0.2 weight parts to about 2 weight parts.

Step 2: To a high pressure reaction container with a polytetrafluoroethylene inner lining are added distilled water and a transition metal salt in turn to form a solution, and the solution is agitated to form a uniform solution; a dispersant is added under intense agitation. Then a first material is added, and an accelerant is added with agitating. Then, a predetermined amount of distilled water is added until about 60% to about 95% of the total volume of the reaction container is filled and then the reaction container is sealed. With continuously agitating, the temperature of the solution is increased to about 110-200° C. and maintained for about 12 hours to 24 hours to obtain a precursor suspension. The precursor suspension is filtered, washed and then dried to obtain a solid product, then the solid product is placed in a speckled furnace and calcined at about 300-900° C. in an air atmosphere for about 4 hours to 12 hours to obtain the negative active material.

The above step is performed in a reaction container, and the negative active material is prepared by a hydro-thermal process. The reaction container may provide a sealed environment for agitating. Under the normal pressure, the water solution will be boiled at about 100° C. When in a sealed condition with a higher pressure, the water solution will have a higher boiling point so that the water solution may have a higher temperature.

The second material may be at least one selected from transition metal oxides, transition metal nitrides and transition metal sulfides. For example, the second material may be at least one selected from the compounds formed by at least one element of Sc, Ti, V, Cr, Mn, Fe, Co, Ni, Zn, Y, Zr, Nb, Mo, Tc, Ru, Rh, Pd, Ag, Cd, La, Hf, Ta, Re, W, Os, Ir, Pt, Au and Hg with at least one element of O, N and S.

In this step, transition metal salts may be used as raw materials. For example, chlorides, nitrates or sulfates of a transition metal may be used to prepare oxides of the transition metal. In one embodiment, the second material is cobaltosic oxide ($Co_3O_4$), and the transition metal salts may be $CoCl_2.6H_2O$, $Co(NO_3)_2.6H_2O$ or $CoSO_4.6H_2O$. The outermost layer is consisting of transition metal oxides, and the preparation method of the outermost layer consisting of transition metal oxides is the in-situ synthesis method. To prepare the outermost layer consisting of transition metal nitrides or transition metal sulfides, nano-particles of transition metal nitrides or transition metal sulfides may be used to coat the composite material obtained in the Step 1, and the methods may be any known in the art, and thus the description thereof is omitted herein for brevity.

The dispersant may be polyethyleneglycol or polyvinylpyrrolidone, to disperse the second material salt well. The accelerant may be selected from ammonia water, ammonium oxalate or sodium tartrate, to promote the formation of the precursor suspension.

In one embodiment, based on 100 weight parts of the composite material prepared in Step 1, the amount of the transition metal salt may be about 0.1 weight parts to 25 weight parts, the amount of the dispersant may be about 0.2 weight parts to 2 weight parts, and the amount of the accelerant may be about 0.2 weight parts to 3 weight parts.

Embodiments of the present disclosure provide a lithium ion battery including the above negative active material, comprising: a battery shell; and an electric core and an electrolyte received in the shell. The electric core may comprise a positive electrode, a negative electrode, and a separator disposed between the positive electrode and the negative electrode. The negative electrode may comprise a negative substrate and a negative active material disposed on the negative substrate, in which the negative active material is the negative active material described above.

In some embodiments, the negative electrode may be prepared by coating a slurry containing the negative active material on the negative substrate. The negative substrate may be a copper foil. To a base material, the above negative active material may be added at a predetermined ratio, and a binding agent and a solvent may be further added and mixed uniformly to form a slurry. The slurry is then coated on the copper foil to form the negative electrode. There is no special limit on the binding agent and the solvent, and any binding agent and any solvent known in the art may be used. In some embodiments, the binding agent may be CMC (sodium carboxymethyl cellulose), and the solvent may be SBR (styrene-butadiene rubber).

The positive electrode may comprise a positive substrate and a positive active material disposed on the positive substrate. In one embodiment, the positive substrate may be an aluminum foil or a nickel screen. The positive active material may be metal sulfides or oxides. For example, the positive active material may be at least one selected from the group consisting of $TiS_2$, $MoS_2$, $V_2O_5$ and lithium composite oxides. There is no special limit on the preparation method of the positive electrode, and the slurry coating method may also be used. The positive material may not only comprise a binding agent and a solvent, but also comprise a conductive agent.

There is no special limit on the electrolyte, and any electrolyte known in the art may be used. For example, the electrolyte may be at least one selected from $LiPF_6$, $LiBF_4$, $LiAsF_6$, $LiClO_4$, $LiCH_3SO_3$, $LiN(SO_2CF_3)_2$, $LiC(SO_2CF_3)_3$, $LiAlCl_4$, $LiSiF_6$, $LiB(C_6H_5)_4$, $LiCl$ and $LiBr$.

There are no special limits on the battery shell, the positive electrode, the electrolyte and the separator, and any battery shell, any positive electrode, any electrolyte and any separator known in the art may be used. The preparation method of the electric core may be any method known in the art and the structure of the electric core may be any structure known in the art, for example, a winding structure, or an overlapping structure.

The present disclosure will be further described in details in conjunction with the detailed examples. And it should be understood that the detailed examples below are only used to explain instead of limiting the present disclosure.

EXAMPLE 1

(1) Preparation of Composite Material

A. 900 g of graphite and 100 g of nanometer grade silicon powder with a median particle size of about 50 nm were added to 2000 g of an organic solvent containing acetone and tetrahydrofuran with a weight ratio of 1:1. Then 10 g of modified polyvinylidene fluoride was added to the solvent. The solution was intensely agitated to form a uniform and stable solid-liquid mixture. The mixture was agitated at 80° C. for 3 hours until most of the solvent was vaporized. The residual was dried at 120° C. under vacuum to obtain a graphite-nano silicon composite material.

B. To a 3 L high pressure reaction container with a polytetrafluoroethylene inner lining, 2000 g of distilled water and 20 g of $CoCl_2.6H_2O$ were added and agitated to form a uniform solution. 10 g of polyethyleneglycol 6000 dispersant was then added to the solution under intense agitation. Then the graphite-nano silicon composite material was added. With agitating, 15 g of ammonium oxalate was added. Afterwards, distilled water was added until 80% of the total volume of the reaction container was filled and the reaction container was then sealed. The temperature inside the reaction container was increased to 180° C. with agitating and then maintained for 24 hours to obtain a precursor suspension. The precursor suspension was filtered, washed and dried to obtain a solid product, and the obtained solid product was placed in a speckled furnace at a temperature of about 400° C. and calcined in an air atmosphere for about 6 hours to obtain the composite material S1. The composite material S1 comprises a core consisting of graphite, an intermediate layer consisting of nano silicon, and an outmost layer consisting of cobaltosic oxide ($Co_3O_4$).

(2) Preparation of Button Cell

The composite material S1 prepared in step 1 was used, and according to the weight ratio of S1:CMC:SBR=100:2:3, S1, CMC and SBR were mixed uniformly and pressed to prepare a negative plate. Then, the negative plate was placed in a 120° C. oven and dried under vacuum for above 12 hours. Afterwards, in a glove box with an argon atmosphere, the negative plate as a working electrode and the metal lithium as a counter electrode were assembled to form a button cell A1.

(3) Preparation of Whole Cell

The composite material S1 as the negative active material was mixed with the binding agent CMC, SBR and water to prepare a negative material. The lithium cobaltate as the positive active material was mixed with the binding agent PVDF, a conductive agent, acetylene black and water to prepare a positive material. The positive and negative materials were compounded, coated, dried, rolled and sliced to obtain positive and negative plates respectively. The positive plate, the negative plate, and a polypropylene separator having a thickness of 20 μm were wound to form a square electric core. The electric core was disposed and sealed in a 5 mm×34 mm×50 mm square aluminum shell to form a 053450 type lithium ion battery. After injecting an electrolyte of 1 mol/L $LiPF_6$ solution of FEC/DEC with a volume ratio of 4/6, laying aside and aging, forming and capacity grading, a whole cell B1 was obtained.

EXAMPLE 2

The method for preparing a composite material S2 is substantially the same as that in Example 1, except that: $NiCl_2.6H_2O$ was used to substitute for $CoCl_2.6H_2O$, ammonia water was used to substitute for ammonium oxalate, the amount of $NiCl_2.6H_2O$ was 25 g, and the amount of ammonia water was about 10 g. 90% of the total volume of the reaction container was filled. The temperature of the mixture in the reaction container was increased to about 55° C. with agitating and then maintained for about 24 hours to obtain a precursor suspension. After the precursor suspension was filtered, washed and dried to obtain a solid product, the obtained solid product was placed in a furnace at a temperature of about 300° C. and calcined in an argon atmosphere for about 6 hours to obtain a composite material S2 comprising an outmost layer consisting of nickel oxide.

A button cell A2 and a whole cell B2 were prepared according to the processes the same as those in Example 1.

EXAMPLE 3

The method for preparing a composite material S3 is substantially the same as that in Example 1, except that: nano zinc powder was used to replace nano silicon power for forming the intermediate layer and calcined at a temperature of 320° C. to obtain a composite material S3 comprising an intermediate layer consisting of nano zinc.

A button cell A3 and a whole cell B3 were prepared according to the processes the same as that in Example 1.

EXAMPLE 4

The method for preparing a composite material S4 is substantially the same as that in Example 1, except that: nano tin powder was used to replace nano silicon power for forming the intermediate layer and calcined at a temperature of 320° C. to obtain a composite material S4 comprising an intermediate layer consisting of nano tin.

A button cell A4 and a whole cell B4 were prepared according to the processes the same as those in Example 1.

EXAMPLE 5

The method for preparing a composite material S5 is substantially the same as that in Example 1, except that: $Co(NO_3)_2.6H_2O$ was used to substitute for $CoCl_2.6H_2O$, ammonia water was used to substitute for ammonium oxalate, the amount of $Co(NO_3)_2.6H_2O$ was 25 g, and the amount of ammonia water was about 10 g. 90% of the total volume of the reaction container was filled. The temperature of the mixture in the reaction container was increased to about 120° C. with agitating and then maintained for about 24 hours to obtain a precursor suspension. After the precursor suspension was filtered, washed and dried to obtain a solid product, the obtained solid product was placed in a speckled furnace at a temperature of about 450° C. and calcined in an argon atmosphere for 6 hours to obtain a composite material S5 of cobalt oxide coated nano silicon.

A button cells A5 and a whole cell B5 were prepared according to the processes the same as those in Example 1.

EXAMPLE 6

The method for preparing a composite material S6 is substantially the same as that in Example 1, except that: $CuCl_2.6H_2O$ was used to replace $CoCl_2.6H_2O$, and a composite material S6 comprising an outmost layer consisting of copper oxide (CuO) was prepared.

A button cell A6 and a whole cell B6 were prepared according to the processes the same as those in Example 1.

COMPARATIVE EXAMPLE 1

(1) Preparation of Composite Material 900 g of graphite and 100 g of nano silicon powder with a median particle size of about 50 nm were added to 2000 g of an organic solvent containing acetone and tetrahydrofuran with a weight ratio of 1:1, and 10 g of modified polyvinylidene fluoride was then added. The mixture was mixed and agitated to form a stable solid-liquid mixture. The solid-liquid mixture was agitated for 3 hours at 80° C. until most of the solvent was vaporized. The residual was dried at 120° C. under vacuum to obtain a graphite-nano silicon composite material SC1.

(2) Preparation of Button Cell

According to the weight ratio of SC1:CMC:SBR=100:2:3, SC1, CMC and SBR were mixed uniformly and pressed to prepare a negative plate. Then, the negative plate was placed in a 120° C. oven and dried under vacuum for above 12 hours. Afterwards, in a glove box with an argon atmosphere, the negative plate as a working electrode and the metal lithium as a counter electrode were assembled to form a button cell AC1.

(3) Preparation of Whole Cell

The composite material S1 as the negative active material was mixed with the binding agent CMC, SBR and water to prepare a negative material. The lithium cobaltate as the positive active material was mixed with the binding agent PVDF, a conductive agent, acetylene black and water to prepare a positive material. The positive material and the negative material were compounded, coated, dried, rolled and sliced to obtain positive and negative plates respectively. The positive plate, the negative plate, and a polypropylene separator having a thickness of 20 μm were wound to form a square electric core. The electric core was disposed and sealed in a 5 mm×34 mm×50 mm square aluminum shell to prepare a 053450 type lithium ion battery. After injecting an electrolyte of 1 mol/L $LiPF_6$ solution of FEC/DEC with a volume ratio of 4/6, laying aside and aging, forming and capacity grading, a whole cell BC1 was obtained.

COMPARATIVE EXAMPLE 2

To a high pressure reaction container with a polyfluortetraethylene inner lining, 2000 g of distilled water and 20 g of $CoCl_2.6H_2O$ were added and agitated to form a uniform solution. 10 g of polyethyleneglycol 6000 dispersant was then added to the solution under intense agitation. Then 100 g of nano silicon powder with a median particle size of about 50 nm was added and the solution was agitated. With agitating, 15 g of ammonium oxalate was added. Afterwards, distilled water was added until 80% of the total volume of the reaction container was filled and the reaction container was then sealed. The temperature was increased to 180° C. with agitating and then maintained for 24 hours to obtain a precursor suspension. The precursor suspension was filtered, washed and dried to obtain a solid product, and the obtained solid product was placed in a furnace at a temperature of about 400°

C. and calcined in an air atmosphere for about 6 hours to obtain a nano silicon-$Co_3O_4$ composite material SC2.

A button cell AC2 and a whole cell BC2 were prepared according to the processes the same as those in Example 1.

Performance Test (1) Specific Capacity Test 20 pieces of each of button cells A1 to A6 and AC1 to AC2 were taken and tested on the Blue-key BK-6016 secondary battery performance testing device at a temperature of about 25±1° C. to obtain the battery capacity thereof. The testing steps are as follows: laying aside for 30 min; discharging the battery to 0.005V at a constant current of about 0.2 mA; discharging the battery to 0.005V at a constant current of about 0.1 mA; discharging the battery to 0.005V at a constant current of about 0.05 mA; then laying aside for 10 minutes; and then charging the battery at a current of 0.2 mA to 2.5V. Then, the specific capacity of the active material was calculated according to the following equation: specific capacity of the active material=tested battery capacity/weight of the active material in the button cell, and the averages of the specific capacities were recorded.

The results were shown in Table 1. Please be noted that the lithium insertion specific capacity is the total specific capacity in the discharging step, and the lithium extraction specific capacity is the total specific capacity in the charging step.

TABLE 1

| | Cell | | | | | | | |
|---|---|---|---|---|---|---|---|---|
| | A1 | A2 | A3 | A4 | A5 | A6 | AC1 | AC2 |
| Lithium insertion specific capacity (or Li-intercalation specific capacity)/mAh/g | 720 | 708 | 710 | 428 | 713 | 677 | 706 | 2320 |
| Lithium specific extraction capacity (or Li-de-intercalation specific capacity)/mAh/g | 585 | 602 | 600 | 393 | 618 | 583 | 506 | 1234 |
| Initial efficiency/% | 81.3 | 85.0 | 84.5 | 91.6 | 86.7 | 86.1 | 82 | 53.2 |

(2) Cycling Test 20 pieces of each of whole cells B1-B6 and BC1 to BC2 were tested on the Kinte BS-9300 secondary battery testing device, and at a temperature of about 25±1° C., the cycling performance of the whole cell was tested at 0.2 C. The steps are as follows: laying aside the battery for 10 min; charging the battery at a constant voltage to 4.2V/0.05 C; laying aside for 10 minutes; and then discharging the battery to 3.0V at a constant current. The above steps form 1 cycle. The steps are repeated until the battery capacity is lower than 80% of the initial discharging capacity. The cycle times are recorded as the battery cycling life, and an average value was taken in each group. The results are shown in Table 2.

TABLE 2

| | Battery | | | | | | | |
|---|---|---|---|---|---|---|---|---|
| | B1 | B2 | B3 | B4 | B5 | B6 | BC1 | BC2 |
| Cycling life/times | 367 | 395 | 465 | 358 | 355 | 358 | 42 | 5 |
| Battery internal resistance after cycling/mΩ | 63 | 71 | 63 | 64 | 63 | 62 | 95 | 120 |

It can be seen from Tables 1 and 2 that, the negative active materials according to Examples 1 to 6 have a higher specific capacity (the carbon material has a specific capacity of about 372 mAh/g), and although the specific capacities of the negative active materials according to Example 1 to Example 6 are lower than that of the negative active material according to Comparative Example 2, the cycling performance of the negative active materials according to Example 1 to Example 6 are much better than those of the negative active materials prepared in Comparative Example 1 and Comparative Example 2. From above, the cycling performances of the batteries made of the negative active material according to the present disclosure are enhanced to a great extent.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A negative active material for a lithium ion battery, comprising:
   a core consisting of a carbon material;
   an intermediate layer consisting of a first material, which is coated on a surface of the core; and
   an outermost layer consisting of a second material, which is coated on a surface of the intermediate layer,
   wherein the first material is at least one selected from the group consisting of elements that form alloys with lithium, and the second material is at least one selected from the group consisting of transition metal oxides, transition metal nitrides and transition metal sulfides.

2. The negative active material of claim 1, wherein, based on the total weight of the negative active material, the amount of the first material is about 2 wt % to 50 wt %, and the amount of the second material is about 0.1 wt % to 20 wt %.

3. The negative active material of claim 1, wherein the core has a spherical shape, and each of the intermediate layer and the outermost layer has a shape independently selected from the group consisting of a hollow spherical shape and a three-dimensional rectangular shape.

4. The negative active material of claim 1, wherein the carbon material comprises at least one selected from the group consisting of graphite, hard carbon, soft carbon, graphitized mesocarbon microbeads, carbon fiber, and carbon nanotube.

5. The negative active material of claim 4, wherein the carbon material comprises at least one selected from the group consisting of graphite, hard carbon, soft carbon and graphitized mesocarbon microbeads; and the carbon material has an average particle diameter of about 2 μm to about 20 μm.

6. The negative active material of claim 4, wherein the carbon material comprises at least one selected from the group consisting of carbon fiber and carbon nanotube; and the carbon material has an average particle diameter of about 10 nm to about 500 nm and a length of 30 about 2 μm to about 50 μm.

7. The negative active material of claim 1, wherein the first material is at least one selected from the group consisting of Si, Ge, Sn, Sb, Al, Pb, Ga, In, Cd, Ag, Hg and Zn.

8. The negative active material of claim 1, wherein the second material is at least one selected from the group consisting of oxides of Sc, Ti, V, Cr, Mn, Fe, Co, Ni, Zn, Y, Zr, Nb, Mo, Tc, Ru, Rh, Pd, Ag, Cd, La, Hf, Ta, Re, W, Os, Ir, Pt, Au and Hg.

9. The negative active material of claim 1, wherein the second material has an average particle diameter of less than 1 μm.

10. A method of preparing a negative active material, comprising the steps of:
   coating a first material on a core consisting of a carbon material; and
   coating a second material onto the first material to obtain the negative active material;
   wherein the first material is at least one selected from the group consisting of elements that form alloys with lithium, and the second material is at least one selected from the group consisting of transition metal oxides, transition metal nitrides and transition metal sulfides.

11. The method of claim 10, wherein, based on the total weight of the negative active material, the amount of the first material is about 2 wt % to 50 wt %, and the amount of the second material is about 0.1 wt % to 20 wt %.

12. The method of claim 10, wherein the core has a spherical shape, and each of the intermediate layer and the outmost layer has a shape independently selected from the group consisting of a hollow spherical shape and a three-dimensional rectangular shape.

13. The method of claim 10, wherein the step of coating a first material further comprises:
   adding the carbon material and the first material to an organic solvent;
   adding a non-water-soluble polymer to the organic solvent to form a mixture;
   agitating the mixture to prepare a uniform and stable solid-liquid mixture; and
   drying the uniform and stable solid-liquid mixture to obtain a composite material of carbon material coated with the first material.

14. The method of claim 10, wherein the step of coating a second material further comprises:
   adding distilled water and a transition metal salt in sequence into a reaction container to form a solution;
   adding the core coated with the first material into the solution;
   increasing the temperature of the solution to obtain a solid product; and
   calcining the solid product to obtain the negative active material.

15. A lithium ion battery, comprising:
   a battery shell; and
   an electric core and an electrolyte housed in the battery shell, wherein the electric core comprises a positive electrode, a negative electrode and a separator disposed between the positive electrode and the negative electrode; and wherein the negative electrode comprises a negative substrate and a negative active material disposed on the negative substrate;
   wherein the negative active material comprises:
   a core consisting of a carbon material;
   an intermediate layer consisting of a first material, coated on a surface of the core; and
   an outermost layer consisting of a second material, coated on a surface of the intermediate layer,
   wherein the first material comprises at least one selected from the group consisting of elements that form alloys with lithium, and the second material comprises at least one selected from the group consisting of transition metal oxides, transition metal nitrides and transition metal sulfides.

16. The negative active material of claim 1, wherein the first material comprises one selected from the group consisting of Si, Zn and Sn.

17. The negative active material of claim 1, wherein the median particle size of the first material is about 50 nm.

18. The negative active material of claim 1, wherein the second material comprises one selected from the group consisting of cobalt oxide, nickel oxide, and copper oxide.

19. The method of claim 14, wherein the transition salt comprises at least one selected from the group consisting of chlorides, nitrates and sulfates of a transition metal.

20. The method of claim 14, wherein the transition salt comprises at least one selected from the group consisting of cobalt chloride, cobalt nitrate, and copper chloride.

* * * * *